Dec. 17, 1935.   V. O. KROMM ET AL   2,024,372
INDIVIDUAL WHEEL SUSPENSION MEANS
Filed Dec. 16, 1933
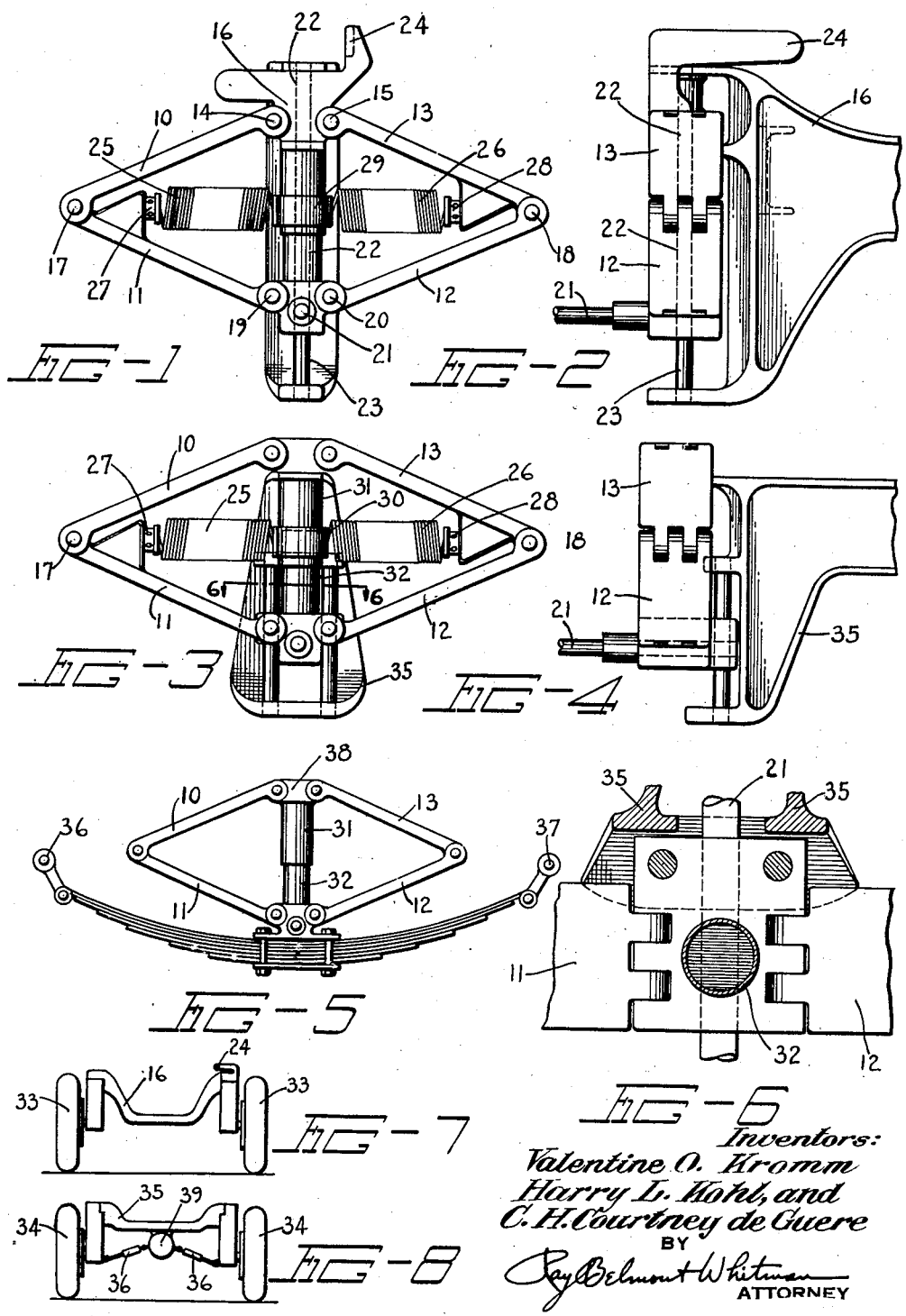
Inventors:
Valentine O. Kromm
Harry L. Kohl, and
C. H. Courtney de Guere
BY
Ray Belmont Whitman
ATTORNEY Patented Dec. 17, 1935

2,024,372

UNITED STATES PATENT OFFICE 2,024,372

INDIVIDUAL WHEEL SUSPENSION MEANS

Valentine O. Kromm, Brooklyn, Harry L. Kohl, Valley Stream, and Charles H. Courtney de Guere, Brooklyn, N. Y.

Application December 16, 1933, Serial No. 702,716

6 Claims. (Cl. 267—20)

This invention relates to spring suspension for automobile bodies, and more especially to an individual wheel suspension means.

An object of the invention is to provide an individual wheel suspension system that can be easily attached to any motor vehicle chassis with few minor changes, or built as a complete chassis.

Another object is to provide a wheel suspension wherein each wheel rides and is suspended in its own complete unit rigidly, and has full freedom of perpendicular movement without affecting the steering mechanism or flexible drive shaft, and which additionally provides full floating individual wheel movement and gives proper rigidity and provides ample safety factors.

All these and other objects, as suggested here below, are attained by the method and means now to be described, and illustrated in the accompanying drawing in which—

Figure 1 is a side elevational view of one of the individual wheel suspension devices adapted for one of the two front wheels of the vehicle.

Fig. 2 is an end elevational view, vertical in character, the same as Fig. 1 but taken at an angle of 90 degrees thereto.

Fig. 3 is a view similar to that of Fig. 1 but showing instead the individual wheel suspension device adapted for use on the rear wheels of the vehicle.

Fig. 4 is a side vertical elevational view of the device of Fig. 3.

Fig. 5 is a modified construction of the invention, being a partial individual wheel suspension for rear wheels already equipped with a transverse leaf spring suspension.

Fig. 6 is a partial cross-sectional view through the line 6—6 of Fig. 3.

Fig. 7 is a somewhat diagrammatic view taken from the front of an automobile equipped with the device of Fig. 1 to show the location of the device between the axle and wheel.

And Fig. 8 is a view similar to that of Fig. 7 but showing the device of Fig. 3 applied between the chassis and rear wheels.

Like numerals refer to like parts throughout the several views.

The patent art to date attests to the fact that many attempts have been made by motor vehicle manufacturers to develop a rigid chassis, with an individual wheel suspension system, in a combined rigid self-contained full floating unit. The results to date have been a series of expensive, complicated devices which only give partial individual wheel suspension.

With applicant's type of device it is necessary to change two important parts of the chassis; on the front, the placing of the steering radius rod and fulcrum arm above the chassis or wheel hub, in order to allow each wheel full individual action and to eliminate any retarding action by the steering mechanism, which remains rigid at all times, regardless of the positions of either wheel. On the rear the differential is fastened solidly to the cross member of the chassis, and in an elevated position to that of the wheel axles, thus providing a higher road clearance.

In the disclosed type of wheel suspension the rear wheels are driven by two short Cardan or sliding shafts 36, 36, Fig. 8, coupled to the differential and wheel axle stub by universal joints; this type of drive is the only one which permits either of the wheels to move up or down in a perpendicular direction without affecting, or straining the flexible drive shafts.

In applicant's invention each wheel rides and is suspended on its own complete unit rigidly, and has full freedom of perpendicular movement. The placing of the steering mechanism— i. e., radius rod and fulcrum—above the wheels, eliminating road shock and makes the unit rigid, giving at the same time ease of control. By putting the differential in an elevated position in relation to the wheel axle and fastening it to the chassis solidly, allows the flexible drive shafts to adjust themselves easily to any required position and compensates the relative positions of the driven wheel and differential.

Applicant's individual wheel suspension for front wheels, as illustrated in Figs. 1 and 2, shows a flexible diamond construction comprising four members 10, 11, 12 and 13, the upper ends of members 10 and 13 being rotatable on pins 14, 15, respectively, rigidly secured to the chassis member 16 and pivoted around pins 17, 18, to the lower members 11, 12. Members 11, 12 are rotatably fastened or mounted on bearing pins 19, 20, which are solidly attached to the wheel axle or stub 21. Perpendicularly aligned guide holes, shown by the dotted line 22, house the king-pin or guide 23 which goes straight through the center in a perpendicular direction; the steering radius arm and fulcrum 24 is connected to the suspension unit at the top.

Two coil springs 25, 26 are attached horizontally together by having their outer ends attached through spring adjustors 27, 28 to flanges on members 11, 13, respectively, and their inner ends attached to a sliding ring 29 through which the king-pin 23 passes, as shown. The expansion and contraction of these two horizontal springs, placed originally somewhat in tension, provide the springing action for the motor vehicle, be it automobile, railway car, omnibus, or what not.

The construction of the individual wheel suspension for the rear wheels, as illustrated in Figs. 3 and 4, is similar to that for the front wheels as just described with the exception that in place of the king-pin 23 there are two stationary guides 31, 32, from top to bottom of the diamond in perpendicular position as shown, and the sliding ring 30 has a somewhat larger diameter hole surrounding the outside pin 31 into the bore of which pin 32 is adapted to slide.

This type of individual wheel suspension can be adapted for use with transverse leaf springs and standard rear semi-elliptic springs in the manner shown in Fig. 5. In this illustration the springs 25, 26 have been omitted from the view for the sake of clarity. Or, of course, one spiral spring might be inserted at the top of pin 32 so that a compression of the diamond would compress this spring.

The front wheels of the car are shown at 33, 33, Fig. 7, and the rear wheels at 34, 34, Fig. 8. The chassis bracket for the rear wheel suspension is shown at 35, and the differential at 39.

The construction shown in Fig. 5 is attached to the chassis at points 36, 37 and 38.

Attention is drawn to the fact that spring adjustor 27 is attached to a flanged lip projecting from member 11 in the lower part of the diamond while spring adjustor 28 is attached to a similar lip projecting from member 13 in the upper part of the diamond. The spring adjustors 27, 28 are of the screw type and adapted by the use of a tool projecting into holes on their peripheries to be turned to tighten or loosen the springs 25, 26. Also attention is invited to the fact that the bearing pin ends of the diamond members 10, 11, 12, and 13 have their ends interlocked as shown, somewhat after the manner of an ordinary door hinge of the pin-holding type. The type of springs used as illustrated in this embodiment is spiral, but, of course, the invention is not limited to any such details.

Having now described the invention, what is claimed as new and for which Letters Patent of the United States is desired, is:

1. An individual wheel suspension including a collapsible diamond-shaped link construction between chassis and wheel, and plural spring means associated with the diamond link system arranged to simultaneously offer a resistance to its collapsing, and a vertical support in which the link construction is adapted to slide, said plural spring means being positioned on either side of said vertical support, one of said spring means being directly connected to one of said lower links near its outer end, and the other spring means directly connected to the opposite upper link near its outer end.

2. The invention as in claim 1, the spring means being positioned horizontally and connecting the extreme ends of the diamond system.

3. The invention as in claim 1, there being two links attached together at one end and with their other ends disposed downwardly and outwardly from one another, and two companion links positioned beneath the first pair of links and having their inner ends attached together to a chassis support and their outer ends projecting outwardly and upwardly and rotatably fastened to the ends of the upper links, respectively.

4. In combination in an individual wheel suspension, a body support and a wheel support immediately therebelow, a vertical guide adapted to restrict the relative movement of the two supports in a vertical line, a ring-like member slidably surrounding the guide, a pair of pivoted members on each side of the guide and extending laterally therefrom and connecting one support with the other, and a horizontal spring connecting each pair of members with the sliding ring.

5. Individual front wheel suspension means comprising a horizontal axle for mounting the wheel, a vertical sliding member adapted to carry the axle and to move towards and away from the body of the vehicle beneath its attaching support thereto, and horizontal plural spring means acting simultaneously and arranged to hold said sliding support in resilient suspension to permit its movement by pressure from above or below, said vertical sliding member being constrained to move in a vertical path through the dual action of a stationary king pin member enclosed within the sliding member and projecting downwardly from a stationary support above, and of a second vertical constraining member slidably engaging a portion of the sliding member and also vertically suspended from above to the king-pin-securing member.

6. The invention as in claim 5, the spring means being horizontally positioned spiral springs and including means for adjusting their tension and compression for different loads or road conditions.

VALENTINE O. KROMM,
HARRY L. KOHL.
C. H. COURTNEY DE GUERE.